No. 737,060. Patented August 25, 1903.

UNITED STATES PATENT OFFICE.

ARON M. BEAM, OF DENVER, COLORADO, ASSIGNOR TO THE BEAM CONVERTING FURNACE COMPANY, A CORPORATION OF COLORADO.

ART OF TREATING ORES FOR RECOVERY OF ZINC AND COPPER.

SPECIFICATION forming part of Letters Patent No. 737,060, dated August 25, 1903.

Application filed May 12, 1899. Serial No. 716,598. (No model.)

*To all whom it may concern:*

Be it known that I, ARON M. BEAM, a citizen of the United States, residing in Denver, in the county of Arapahoe and State of Colorado, have invented a new and useful Improvement in the Art of Treating Ores for Recovery of Zinc and Copper, of which the following is a specification.

My invention relates to an improvement in the art of treating copper or zinc ores.

The object of my invention is to provide a simple, cheap, efficient, and expeditious process for recovering zinc and copper from ores containing the same.

My invention or process consists, essentially, in first pulverizing the ore to from forty to eighty mesh; second, subjecting the pulverized ore in connection with a suitable flux or reagent in a closed oven or muffle to the action of a low degree (from 250° to 500° Fahrenheit) of indirect heat, while free admission of air is excluded for a short time (from fifteen to sixty minutes) or until the sulfids of zinc and copper are partially converted into sulfates; then admitting fresh air, preferably in a heated condition, to the ore in the muffle and subjecting it to the action of a low degree of indirect heat and the admitted air for a short period (from fifteen to sixty minutes) or until the conversion of the insoluble sulfids of copper and zinc into soluble sulfates is completed; then, the converted ore being removed from the furnace, leaching it with water until the sulfates of zinc and copper form a solution therewith, and then precipitating the zinc and copper from the solution in any usual or customary way, as by electrolysis, or by use of the customary chemical precipitants.

If the ore contains both zinc and copper in quantities to be saved, the flux or reagent for changing or converting the zinc sulfids to sulfates is first added to the ore, the same preferably consisting of carbon, fused salt, (common anhydrous sodium chlorid,) carbonate of potash, and silica, and then the ore is heated in and treated in the closed oven or muffle, as above described, until the conversion of the zinc sulfids to sulfates is completed; and then a flux or reagent for the conversion of copper sulfids is added, the same consisting, preferably, of carbon, fused salt, carbonate of ammonia, and silica, and the ore further heated until the conversion of the copper sulfids to soluble sulfates is completed. Then the converted ore is removed from the oven or muffle and leached with water to dissolve the zinc and copper sulfates, and then the solution is treated to precipitate first the zinc or copper and then the other.

If the ore contains only zinc in sufficient quantities for saving, the flux or reagent for the zinc alone is used, and if it contains only copper only the flux or reagent for the copper is used.

The proportion of the ingredients of the flux or reagent is preferably about or substantially sixty-eight per cent. of carbon, twenty-two per cent. of fused salt, (common anhydrous sodium chlorid,) eight per cent. of carbonate of potash or carbonate of ammonia (one being the equivalent for the other, according as the ore is being treated for zinc or copper,) and two per cent. of silica, although the particular proportions and composition of the flux or reagent will vary materially with the particular character and composition of the ore being treated. By fused common salt I mean common salt from which the water of crystallization has been driven off by heat. I use fused common salt as contradistinguished from common salt to prevent the formation of chlorin gas or other injurious action. The fused common salt used in my process may be chemically defined as anhydrous sodium chlorid.

I claim—

1. The process of recovering zinc or copper from ores, consisting in first pulverizing the ore, then subjecting it, in connection with a suitable oxidizing flux or reagent mixed therewith, in a closed oven or muffle, to the action of a low degree of indirect heat while the air is excluded, for a short time, or until the sulfids of zinc or copper are partially converted into sulfates, so that air may be afterward admitted without burning the sulfur, then admitting air to the ore in the oven or muffle, and completing the conversion of the sulfids into sulfates by subjecting the ore for a further short time to a low degree of indirect heat, then leaching the converted ore with water and finally precipitating, substantially as specified.

2. The process of recovering zinc or copper from ores, consisting in first pulverizing the ore, then subjecting it, in connection with a suitable flux or reagent composed of carbon, anhydrous sodium chlorid, an oxidizing salt, and silica, to the action of a low degree of indirect heat while the air is excluded for a short time or until the sulfids of zinc or copper are partially changed into sulfates, then admitting air to the ore and continuing the heating for a short time or until the conversion of the sulfids into sulfates is completed, then leaching the converted ore with water, and finally precipitating, substantially as specified.

ARON M. BEAM.

Witnesses:
EDMUND ADCOCK,
H. M. MUNDAY.